United States Patent [19]
Doherty

[11] 3,771,492
[45] Nov. 13, 1973

[54] WATER CIRCULATION SYSTEM FOR FRESH WATER FISH HUSBANDRY

[75] Inventor: William A. Doherty, Knoxville, Tenn.

[73] Assignee: Marine Protein Corporation, New York, N.Y.

[22] Filed: Mar. 30, 1970

[21] Appl. No.: 23,625

[52] U.S. Cl. .................................................. 119/3
[51] Int. Cl. ............................................ A01k 61/00
[58] Field of Search ........................................ 119/3

[56] References Cited
UNITED STATES PATENTS

| | | | |
|---|---|---|---|
| 1,509,979 | 9/1924 | Pryor | 119/3 |
| 3,116,712 | 1/1964 | Ogden et al. | 119/3 |
| 3,122,126 | 2/1964 | Yamada | 119/3 |
| 3,255,731 | 6/1966 | Girard | 119/3 |

*Primary Examiner*—Hugh R. Chamblee
*Attorney*—Kenyon & Kenyon Reilly Carr & Chapin

[57] ABSTRACT

This invention relates in general to a system and method for handling the large quantities of water required in the raising of fresh water fish in an artificial environment and more particularly to a technique for economically handling and treating the water so that it can be reused.

8 Claims, 2 Drawing Figures

INVENTOR.
WILLIAM A. DOHERTY
BY
ATTORNEYS

WATER CIRCULATION SYSTEM FOR FRESH WATER FISH HUSBANDRY

BACKGROUND OF THE INVENTION

There are many reasons why it is desirable to raise fish in an artificial setting and environment. Among these are the ability to control predators, prevent infection and disease, supply food and oxygen at a rate that will result in maximum growth rates for the fish involved, and program production throughout the year to supply fish in the quantity and at the rate desired for market and for efficient use of processing and marketing equipment and organization.

If the fish husbandry operation is to be economic, fish have to be raised at a very high density of fish to a given volume of water. But, in order to provide the oxygen required and to remove metabolite waste products, water has to circulate through the artificial environment in which the fish are raised at a high rate. As a consequence, large amounts of water are required. The water has to be pure, it has to be in a relatively narrow temperature range, and it has to be in large volume. As a consequence, there are relatively few areas where optimum water conditions can be found. Such areas are usable only if some technique is provided to return a large portion of the water to the underground system or water table from which water is obtained.

Accordingly, it is a major purpose of this invention to provide a water handling technique and system which is adapted to continuously provide the large quantities of water required in an economic high density fish husbandry operation.

It is a more particular purpose of this invention to provide such a water handling system as will conserve the water employed while at the same time providing fresh water for the fish being raised which water is essentially free of metabolites, including ammonia, and is also free of harmful bacteria or other sources of infection.

A further particular purpose of this invention is to provide such a system as will maintain the water supply for the fish at the desired temperature range to provide optimum fish growth.

BRIEF DESCRIPTION OF THE INVENTION

In brief, this invention involves a system in which a local, natural water table is employed as the source of water used in the fish husbandry operation. A plurality of wells or springs are employed to tap the water and to bring it to the surface for access in the tanks and/or raceways in which the fish are being raised. The water is then passed through a series of tanks and/or raceways in which fish are being raised. In the course of being passed through these tanks and/or raceways, the water is treated by having at least oxygen and feed added thereto. The water picks up metabolites, including ammonia, thrown off by the fish. As a consequence, the water becomes sufficiently polluted so that it can no longer be used for the economic raising of fish. This water that can no longer be used in the actual fish husbandry portion of this system, is then filtered to remove the solid particle or offal component of the metabolites. The filtered water is then put into a large settling pond which, in the preferred embodiment, is lined with oyster shells. As the water sits in the settling pond, a large proportion of the ammonia escapes into the atmosphere. Additionally sunlight causes breakdown of some of the ammonium compounds releasing ammonia which also escapes. Both effects reduce the amount of dissolved ammonium products to an acceptably low level. The water then gradually passes through the layer of oyster shells and into the earth around and below the settling pond. As the water passes through the earth it becomes further purified and returns to the water table. At the water table, the water's temperature returns to that of the water table, which is the water temperature for which the site was selected in the first place and is a temperature at which the particular species or species of the fish involved will have close to optimum growth.

BRIEF DESCRIPTION OF THE DRAWINGS

Other objects and purposes of this invention will become apparent from the following detailed description and drawings, in which.

DETAILED DESCRIPTION

Figure 1:
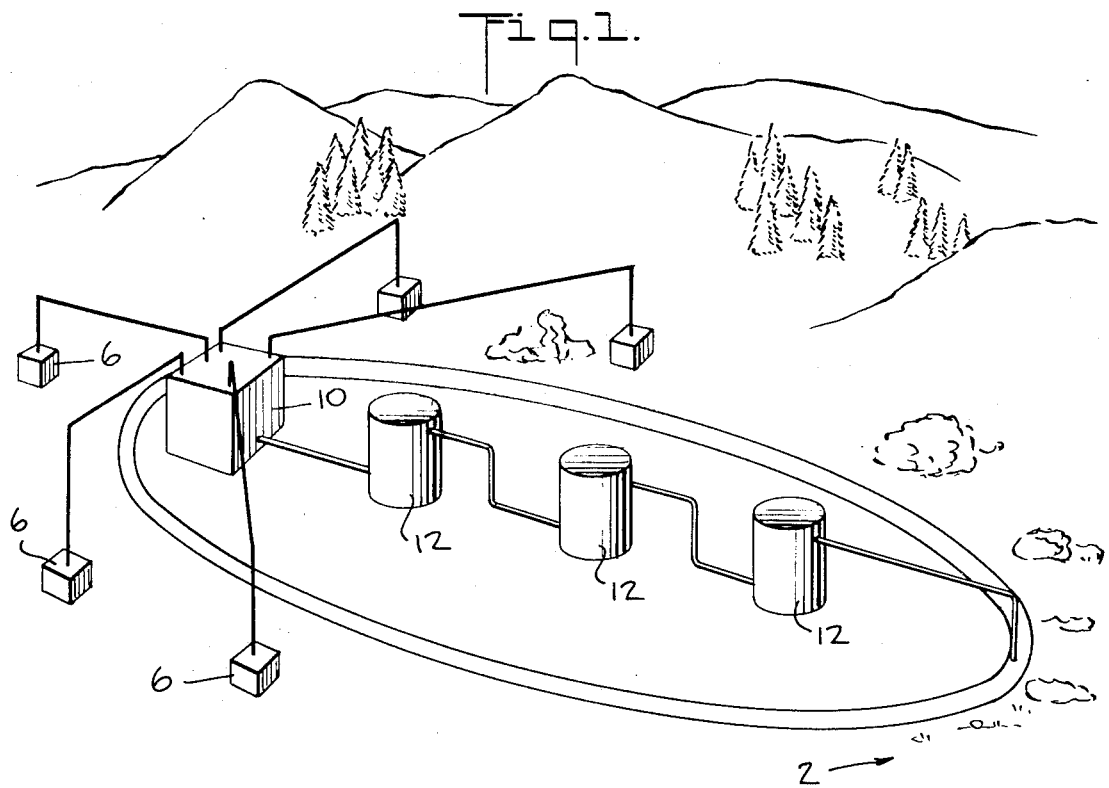
FIG. 1 is a schematic illustration of the system of this invention.

Referring to FIG. 1 of the drawings, a fish husbandry system according to a preferred embodiment of the invention thereshown.

Figure 2:
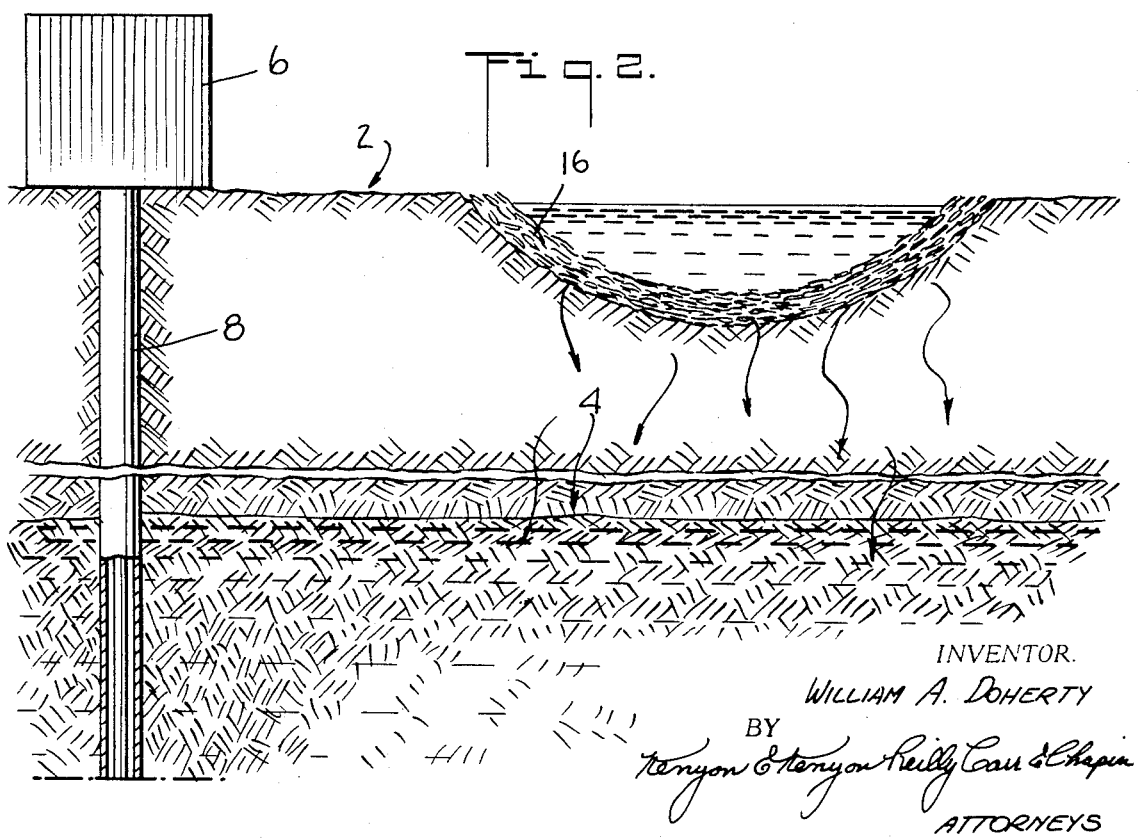
FIG. 2 is a cross-sectional side view of a portion of the system shown in FIG. 1 taken along the lines 2—2 therein.

The system is located on the surface 2 of a body of land of generally flat configuration. Spaced below the surface of the land is a water-bearing strata 4 (FIG. 2) which may be referred to as an aquifer or water table. A plurality of pumping stations 6 built on the surface, pump water up from the aquifer 4 via conventional well shafts 8 extending down into the aquifer.

The various pumping stations 6 feed the water to a central distribution station 10. From the central distribution station 10, the water is pumped through a series of large fish containing, vertically standing tanks or containers 12. The tanks 12 contain the fish in very high density.

As the water passes through the various tanks 12, waste products associated with the fish pass into, and pollute the water. The waste products include solid components such as fish excrement and unconsumed fish food and also include dissolved metabolites, including ammonia and ammonium compounds or products, thrown off by the fish.

If the amount of water in the aquifer was virtually unlimited, the polluted water leaving the last of the containers 12 could be directed away to some suitable outlet, such as a river, with fresh water being extracted from the aquifer to replace that lost. However, the present system is intended for use in many locations where the total volume of water in the aquifer is not unlimited in relation to the daily flow requirements of the system. For example, it is contemplated that a fish husbandry system according to the present invention may be employed in certain locations in Tennessee or Kentucky where the available aquifer area is of the order of one mile square. With a contemplated daily flow in the order of tens of millions of gallons per day and without replenishment of the water in the aquifer the level of water in the aquifer could be lowered so considerably within the space of a month or so as to require the installation of deepened well shafts and more powerful pumping machinery. Eventually the aquifer might even become exhausted.

It would therefore be desirable to return the polluted water leaving the containers 12 to the aquifer to maintain a stable water level in the aquifer. However, if this should be done directly, the level of pollutants in the aquifer would cumulatively increase. Eventually, the water being pumped up from the aquifer to enter the containers 12 would be so polluted as to degrade fish growth to a level below that necessary to keep the economics of the system competitive with that of other methods of fish husbandry.

It is therefore necessary with a limited aquifer, to return the water from the containers 12 to the aquifer in an unpolluted condition. For this purpose, the water leaving the last of the containers 12 is delivered to a moat-like ditch 14, encircling the containers, dug in the surface 2 of the earth. The moat is located above the aquifer 2 within the peripheral borders thereof, so that the majority of the water within the moat 14 percolating downwardly through the earth strata, returns to the aquifer. Desirably, to achieve a satisfactory rate of percolation, an earth strata containing substantial proportions of limestone and gravel should be chosen.

The moat 14 is relatively shallow so that a large surface area of water is presented to the effects of atmosphere and sunlight. This large surface area assists the escape of ammonia into the atmosphere thus reducing the proportion of ammonia and dissolved ammonia products in the water. Ths shallow depth also maximizes the effect of rays of sunlight penetrating into the water, it having been found that sunlight further tends to break down the ammonium products and release ammonia to the atmosphere. As a result, the water standing in the moat is reduced by the effects of atmospheric exposure and sunlight, to a condition in which the level of ammonium products dissolved in the water attains an acceptably low level.

The earth itself acts as a filter screening out the solid wastes previously referred to, as the water percolates back to the aquifer, so that the wastes do not enter the aquifer. In addition, naturally occurring bacteria in the soil break down any ammonium products remaining in solution. As the distance through the earth to which the water must percolate is usually several hundred feet, these effects continue for a prolonged period, with the result that the water being returned to the aquifer is substantially pollution free.

Additionally, the percolating water is brought to the temperature of the surrounding earth so that the water returns to the aquifer at the same temperature. Thus the water extracted from the aquifer is at a substantially constant temperature and the fish type being grown may be suitably matched to the water temperature for optimum growth.

As a further refinement, the bed of the moat 14 may be lined with oyster shells 16 (FIG. 2), it having been found that oyster shells provide a surface on which fungal and bacterial growths which break down the dissolved ammonium products, may grow.

It will be appreciated that the fish husbandry system described, thus provides for the high density commercial husbandry of fish at an inland location, utilizing an aquifer of limited capacity. By returning and recycling the water, the level of the aquifer may be maintained substantially constant so that well shafts of a fixed depth and pumping equipment of a predetermined capacity may be used continuously. Moreover, the removal of the waste products from the water by the effects of atmosphere and sunlight and by percolation through the intervening strata back to the aquifer, enable the necessary recirculation of the water to be achieved without a progressive and cumulative build up of pollution to an unacceptable extent.

What is claimed is:

1. A method of high density, fish husbandry at an inland, surface location, spaced above an aquifer, the method comprising in sequence the steps of:
   bringing water to the surface through at least one well extending down into the aquifer;
   passing the water through at least one region in which fish are confined at high density;
   entraining into the water during its passage through the region, waste products associated with the fish including solid wastes and ammonia in solution;
   delivering the water to a settling tank dug in the surface of the earth at a rate generally equal to the combined rate at which water is lost from the settling tank by evaporation and by downward percolation of water through the underlying earth strata back to the aquifer.

2. The method as defined in claim 1 including a step of configuring the settling tank to be relatively shallow to maximize the surface area of water in the tank exposed to atmosphere and sunlight thereby increasing the rate at which ammonia escapes to atmosphere and is degraded in solution by the action of sunlight.

3. The method as defined in claim 1 including the additional step of lining the settling tank with oyster shells to cause the growth thereon of bacteria which break down ammoniated products in the water.

4. The method as defined in claim 1 including the steps of:
   positioning the region within which the fish are confined generally centrally above the aquifer; and
   configuring the settling tank as a moat extending about the confined region, above and within the borders of the aquifer to ensure that a major portion of the water percolating downwardly through the earth strata from the settling tank is returned to the aquifer.

5. A system for high density, fish husbandry at an inland surface location spaced above an aquifer, the system comprising:
   well means extending into the earth communicating with the aquifer for bringing water therefrom to the surface;
   container means mounted on the surface of the earth for containing fish in high density, said container means being in fluid communication with said well means receiving a continuous, high volume flow of water;
   a settling tank dug in the surface of the earth in fluid communication with said container means to receive water leaving said container means, said settling tank causing water to percolate downwardly through the underlying earth strata back to the aquifer, whereby the solid wastes are removed from the water and the ammoniated products are broken down by naturally occurring soil bacteria in the earth strata.

6. The system as defined in claim 5 wherein:
   said settling tank is relatively shallow to maximize the surface area of water exposed to atmosphere and sunlight, thereby increasing loss of ammonia by evaporation and degradation of ammoniated products by the action of sunlight.

7. The system as defined in claim 6 further including:
a layer of oyster shells lining the bed of said settling tank, said oyster shells being covered with a layer of bacteria for breaking down the ammoniated products in the water.

8. The system as defined in claim 7 wherein:
said settling tank is configured as a moat encircling said container means and positioned generally centrally of, above and within the borders of the aquifer to ensure that a major portion of the water percolating downwardly from said tank returns to the aquifer.

* * * * *